UNITED STATES PATENT OFFICE.

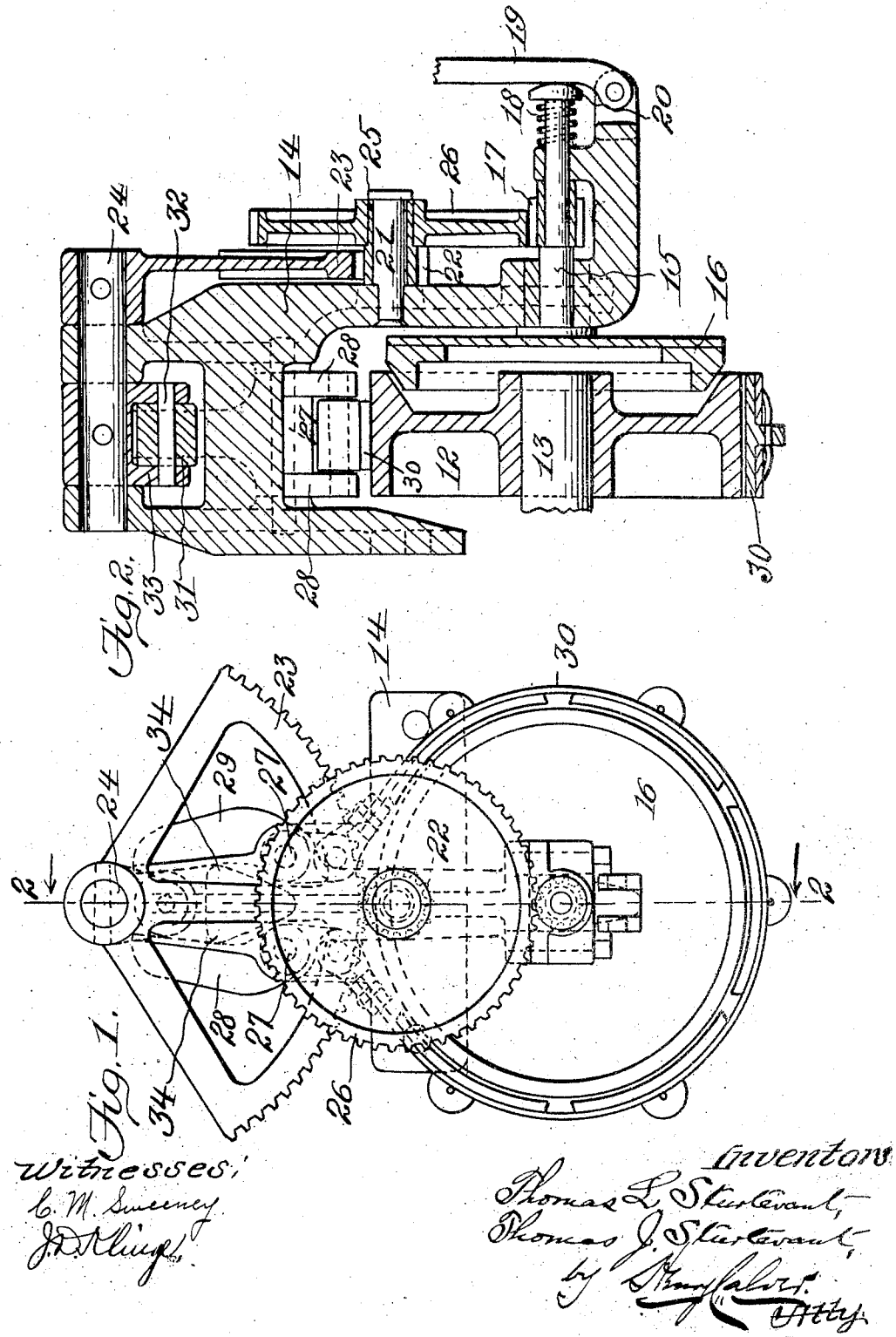

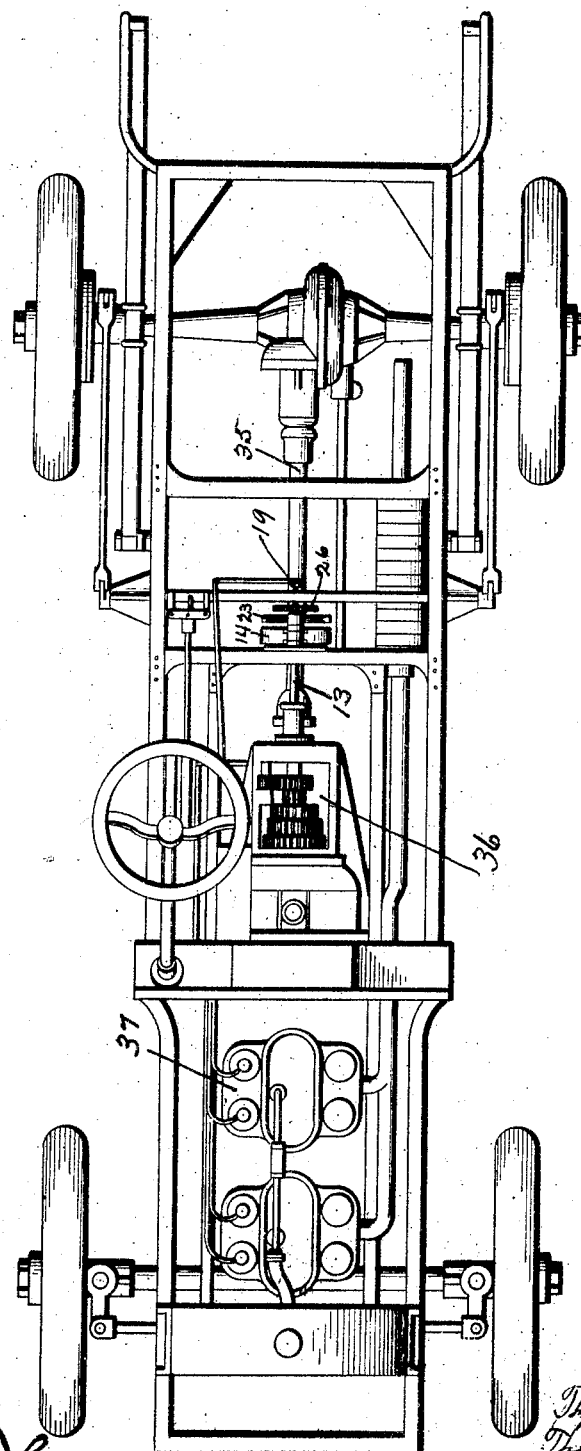

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

VEHICLE-BRAKE.

No. 838,061.

Specification of Letters Patent.

Patented Dec. 11, 1906.

Application filed October 27, 1905. Serial No. 284,631.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented or discovered certain new and useful Improvements in Vehicle-Brakes, of which the following is a specification, reference being had therein to the accompanying drawings.

This invention relates to a brake for arresting the movement of a rotating part, and which is more especially adapted for use in connection with automobiles or motor-cars, but which is also adapted for use for other purposes.

The present invention has for its object to provide a mechanically-operated friction-brake which is of such construction that the power exerted to set the brake may be derived from the rotating wheel or part the movement of which is to be arrested or restrained or from some rotating wheel or part connected therewith or deriving motion therefrom, the invention preferably comprising means whereby the brake may be set whether the said rotating part be moving in one direction or the other, so that if the brake be applied to a motor-vehicle the braking force may be exerted whether the vehicle be moving forward or backward.

In carrying the invention into effect a friction-band encircling the wheel or drum to which the braking force is to be applied is preferably employed, the opposite ends of said friction-band being preferably connected to two operating-levers, either of which may be moved to effect the braking action or for setting the brake. These operating-levers are preferably arranged to be actuated from a swinging segment, which is geared to a shaft provided with a friction disk or wheel, preferably constructed as a clutch disk or wheel, to be forced into clutching engagement with the wheel to which the braking force is to be applied, although the power derived from the moving wheel to be arrested, and which power is exerted in setting the brake, might be transmitted through a frictionally-driven wheel instead of through a clutching wheel or disk. The frictionally-driven clutch or wheel is preferably mounted on an endwise-movable shaft, so that the friction device or clutch may be manually engaged with the part by which it is to be driven at any desired pressure, allowing a suitable slip between the frictionally-driven and friction-driving parts when only a light braking force is to be applied. If it be desired to control only the forward movements of a vehicle, only a single brake-setting lever operated by the movement of the vehicle need be employed.

The invention may be understood by reference to the accompanying drawings, in which—

Figure 1 is a side view of an apparatus embodying the invention; and Fig. 2, a central vertical section of the same on line 2 2, Fig. 1. Fig. 3 is a plan view of the chassis of an automobile comprising the invention.

Referring to the drawings, 12 denotes a wheel or drum which, it will be understood, is to be connected with the driving-wheels of the vehicle, so that it will be in rotation whenever the vehicle is in motion, whether the engine or motor be running or not, and 13 is a shaft on which the said wheel or drum is rigidly mounted, so as to rotate therewith. The rotating brake wheel or drum 12, to which the braking force is applied, is, of course, located intermediate the engine or motor and the wheels of the vehicle, as it would be seriously injurious to automobile-tires to apply braking force thereto.

14 denotes a frame adapted for attachment to some suitable part of the vehicle-frame and conveniently adjacent to the wheel or drum 12. Slidingly mounted in the frame 14 is an endwise-movable shaft 15, provided with a clutch disk or wheel 16 and with a rigidly-attached pinion 17, the outer end of the said shaft being encircled by a spring 18, having a tendency to hold the clutch disk or wheel 16 out of engagement with the clutching portion of the wheel or drum 12. An operating-lever 19, which may be either a foot or hand lever or which may be actuated from a push rod or button, is arranged to press against a head 20 on the outer end of the shaft 15, so that when desired said shaft may be forced inward to engage the clutch wheel or disk 16 with the wheel or drum 12. The frame 14 is provided with a stud 21, on which rotates a pinion 22, meshing with a gear-sector 23, attached to a rock-shaft 24, having bearings in the frame 14. Fixed to a sleeve 25 of the pinion 22 is an intermediate gear-wheel 26, meshing with the pinion 17 and serving to transmit motion from the said pinion to the said gear-sector through the pinion 22.

Pivotally mounted on the pins 27 in the frame 14 are two levers 28 and 29, the lower arms of which are connected with the opposite ends of a brake-band 30, encircling the wheel or drum 12, and between the upper ends of said levers is an operating part or abutment consisting in the present instance of a friction-roll 31, mounted on a pin 32, carried by an arm 33, fixed to the shaft 24, so that a rocking movement of said shaft in either direction will operate one of the levers 28 or 29 to cause the friction-band 30 to grip the wheel or drum 12. The resilience of said friction-band, which is preferably of steel, will cause the said band to free itself from frictional contact with the wheel or drum 12 when an operating-lever is released, and such resilience of said band will also tend to move the upper ends of said levers inward against stops 34 on the frame 14 and one of which stops will serve as a resistance to the inward movement of one of said levers 28 or 29 when the other lever is forced outward to set the brake, in which case the brake-band will of course pull on the opposite lever, to which it is connected.

The shaft 13, to which the brake wheel or drum 12 is attached, is suitably connected with the cardon-shaft 35 through gearing in the gear-box 36 in any usual or suitable manner, the said gearing being also operatively connected in any well-known or usual manner with the shaft of the motor or engine 37, and the said cardon-shaft 35 being also connected or geared in any suitable or well-known manner with the rear axle or driving-wheels of the vehicle. In thus applying the invention to an automobile or motor vehicle, as hereinbefore referred to, it will be seen that the brake wheel or drum to which the braking force is to be applied is located between the motor or engine and the driving-wheels of the vehicle.

The operation of the invention is as follows: When the driver desires to arrest or restrain the travel of the vehicle, whether the same be moving either forward or backward, he operates the lever 19 to force the shaft 15 inward, (in the form of the invention herein shown and described,) so as to engage the clutch wheel or disk 16 with the clutch-face on the wheel or drum 12, and rotary movement is through said clutch wheel or disk 16 imparted to the shaft 15 and from the latter, through the pinion 17, gear-wheel 26, and pinion 22, to the gear-sector 23, so that the shaft 24 is rocked in one direction or the other to actuate one or the other of the levers 28 29, and thus tighten the brake-band 30 around the wheel or drum 12. If only a slight braking movement be desired, of course the manual power will be only gently applied to the lever 19, so that there will be more or less slip between the clutch wheel or disk 16 and wheel 12, and thus only a light braking force will be exerted; but if it be desired to set the brake powerfully of course the lever 19 will be so operated as to press the clutch wheel or disk 16 inward against the clutch-face of the wheel or drum with considerable force. Owing to the fact that the braking power of the shaft 15 is transmitted from the pinion 17 on shaft 15 to the gear-sector 23 through the large gear-wheel 26 and the pinion 22, rotating with said gear-wheel, it will be evident that while the speed of movement of said shaft 15 will be greatly reduced when received by said gear-sector the power in applying the braking force will be vastly increased or multiplied, thus providing for a great purchase or power to set the brake when required to arrest the movement of the vehicle quickly.

From the foregoing it will be understood that the invention provides means whereby within wide limits any desired amount of braking force may be mechanically applied for the purpose of arresting or restraining the movement of a vehicle which may be moving in either direction, the momentum or moving force of the vehicle itself or of the motor being utilized for the purpose of setting the brake, so that the said brake can be set or applied whether the motor or engine of the vehicle be in operation or not. In other words, it will be understood that the force necessary to set the brake will generally be derived from the momentum of the moving vehicle and not necessarily from the engine or motor driving such vehicle. It will also be apparent that the application of this engine or momentum utilized force may be regulated or controlled from any convenient operating lever or rod by which the clutching or driving parts are forced into frictional engagement, the frictional pressure being only gently exerted when a light braking force is desired, but being more forcibly exerted when more braking force for suddenly arresting the movement of the vehicle or for controlling such vehicle when descending steep grades is necessary.

As hereinbefore stated, the controlling-lever 19 may be either a hand or foot operated lever, and the terms "manual" or "manually operated" as employed in the claims of this specification are to be understood as referring to either a hand or foot operated device for causing the friction device or clutch element to engage the rotating part to be arrested or restrained, so that the power derived from such rotating part will be utilized to arrest or restrain its rotation or movement.

Having thus described our invention, we claim and desire to secure by Letters Patent—

1. In a motor-vehicle brake mechanism, the combination with a friction brake device and a rotating brake wheel or drum located between the engine or motor of the vehicle and the driving-wheels thereof, of means, comprising a friction-clutch and multiplying gearing, whereby the movement of a rotating part may be utilized to apply braking force, with increased leverage, to said brake wheel or drum, for the purpose of arresting or restraining movement of the vehicle.

2. In a motor-vehicle brake device, the combination with a brake wheel or drum separate from but connected with the driving-wheels of the vehicle, of a friction brake device, means whereby power derived from a rotating part may be utilized to apply said brake device to said brake wheel or drum, said means comprising a friction-clutch one element or member of which is formed on said brake wheel or drum and the other element or member of which is carried by an endwise-movable shaft, and power-multiplying gearing, whereby the power derived from said rotating part will be increased in applying said brake device to said brake wheel or drum when the movement of the vehicle is to be restrained.

3. In a motor-vehicle brake, the combination with a friction brake device, of a rotating brake wheel or drum separate from but connected with the wheels of the vehicle and deriving motion from the vehicle or its motor, and manually-controlled means, comprising a friction-clutch, whereby power derived from a rotating part may be utilized to apply said brake to said brake wheel or drum; so that when the motive power of the vehicle is shut off the brake may still be applied by the motion and momentum of the vehicle itself.

4. In a motor-vehicle brake mechanism, the combination with a friction brake device, and a brake wheel or drum to which said brake device is to be applied, and which is separate from but connected with the wheels of the vehicle, said brake wheel or drum being constructed to form one element or member of a friction-clutch, of manually-controlled means, comprising a friction-clutch disk, an endwise-movable shaft by which said friction-clutch disk is carried, and power-increasing gearing operated from said shaft, whereby the movement of a rotating part may be utilized, with greatly-increased leverage, to apply the said brake device for the purpose of arresting or restraining movement of the vehicle.

5. In a motor-vehicle brake mechanism, the combination with a friction brake device and a brake wheel or drum constructed to form one element of a friction-clutch, a friction-clutch disk, an endwise-movable shaft by which said friction-clutch disk is carried, a pinion on said shaft, a gear-wheel meshing with said pinion, a second pinion driven from said gear-wheel, a sector-gear meshing with said second pinion, and means, connected with said sector-gear, for applying braking force to said brake wheel or drum.

6. In a vehicle-brake device, the combination with a brake wheel or drum, of a brake-band for applying friction thereto, a friction-clutch one member of which is formed on said brake wheel or drum, an endwise-movable shaft on which the other member of said clutch is mounted, manually-operated means for causing frictional engagement of the members of said clutch, and connections between said shaft and said brake wheel or drum by which the momentum or movement thereof may be utilized to arrest or restrain its movement.

7. In a vehicle-brake, the combination with a rotating brake wheel or drum located between the motor and the driving-wheels of the vehicle, of a brake-band for applying friction to said brake wheel or drum, a friction-clutch one member of which is formed on said brake wheel or drum, an endwise-movable shaft on which the other member of said clutch is mounted, manually-operated means for causing frictional engagement of the members of said clutch, one or more operating-levers connected with the said brake-band, and a train of power-increasing gearing and connections for actuating said levers; whereby the momentum of said brake wheel or drum, or of the vehicle, may be utilized to arrest or restrain movement of said vehicle.

8. In a vehicle-brake, the combination with a rotating brake wheel or drum, of a brake-band for applying friction thereto, a friction-clutch, an endwise-movable shaft on which one member of said clutch is mounted, manually-operated means for causing frictional engagement of the members of said clutch, operating-levers connected with the opposite ends of said brake-band, a swinging gear-sector connected with said levers, and a train of gearing connecting said endwise-movable shaft with said sector, whereby the momentum or movement of said rotating brake wheel or drum may be utilized to arrest or restrain its movement.

9. In a vehicle-brake mechanism and in combination, a brake wheel or drum, a brake-band encircling said wheel or drum, levers connected with both ends of said brake-band, stops against which one or the other of said levers takes a fixed bearing, according to the direction of rotation of said brake wheel or drum, and a friction-clutch device and connections through which said levers are operated to tighten said brake-band by power derived from said wheel or drum.

In testimony whereof we affix our signatures in presence of two witnesses.

THOMAS LEGGETT STURTEVANT.
THOMAS JOSEPH STURTEVANT.

Witnesses:
L. H. STURTEVANT,
RUBERT M. GAY.